(12) United States Patent
Smutny et al.

(10) Patent No.: US 7,757,997 B2
(45) Date of Patent: Jul. 20, 2010

(54) CLIP FOR FASTENING AN ARTICLE TO A PANEL HAVING A SELF-EXPANDING CLIP HEAD

(75) Inventors: Dale J. Smutny, Canfield, OH (US); Brian Gene Angelo, Warren, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/221,184

(22) Filed: Jul. 31, 2008

(65) Prior Publication Data

US 2010/0025547 A1 Feb. 4, 2010

(51) Int. Cl.
*F16B 45/00* (2006.01)
(52) U.S. Cl. .............. 248/71; 248/68.1; 248/74.3; 411/508; 24/453; 24/16 R
(58) Field of Classification Search ............ 24/453, 24/297, 16 R; 411/508, 509, 510, 913, 21, 411/22; 248/68.1, 71, 74.3, 74.5, 67.5, 70, 248/65, 73, 49, 74.2, 74.1
See application file for complete search history.

(56) References Cited

U.S. PATENT DOCUMENTS

| | | | | |
|---|---|---|---|---|
| 2,424,757 | A | * | 7/1947 | Klumpp, Jr. ............ 174/153 G |
| 2,931,851 | A | | 4/1960 | Sims |
| 3,079,581 | A | * | 2/1963 | Klumpp, Jr. ............... 439/557 |
| 3,210,030 | A | | 10/1965 | Ramsey et al. |
| 4,490,886 | A | * | 1/1985 | Omata ...................... 24/16 PB |
| 4,704,059 | A | * | 11/1987 | Nakama et al. .............. 411/182 |
| 4,712,341 | A | * | 12/1987 | Harris et al. ................... 52/208 |
| 4,735,387 | A | * | 4/1988 | Hirano et al. .................. 248/71 |
| 4,787,795 | A | * | 11/1988 | Kraus ......................... 411/510 |
| 4,927,306 | A | * | 5/1990 | Sato ............................ 411/182 |
| 5,012,995 | A | | 5/1991 | Ward et al. |
| 5,362,018 | A | | 11/1994 | Darr et al. |
| 5,448,809 | A | * | 9/1995 | Kraus ............................ 24/453 |
| 5,669,731 | A | | 9/1997 | Hironaka et al. |
| 5,706,559 | A | * | 1/1998 | Oliver et al. .................. 267/49 |
| D413,508 | S | * | 9/1999 | Shibao ........................ D8/382 |
| 5,947,631 | A | | 9/1999 | Hironaka et al. |
| 6,203,240 | B1 | * | 3/2001 | Hironaka et al. ............ 403/397 |
| 6,253,423 | B1 | * | 7/2001 | Friedrich et al. .............. 24/293 |
| 6,283,512 | B1 | * | 9/2001 | Butterbaugh et al. .......... 292/87 |
| 6,417,451 | B1 | | 7/2002 | Uchiyama |
| 6,749,157 | B2 | * | 6/2004 | Takeuchi ....................... 248/71 |

(Continued)

FOREIGN PATENT DOCUMENTS

GB 2316707 A * 3/1998

*Primary Examiner*—Kimberly T Wood
(74) *Attorney, Agent, or Firm*—Thomas N. Twomey

(57) ABSTRACT

A clip for fastening an article to a panel having a hole has a base and a self expanding head attached to the base. The self-expanding head has at least one column extending from the base to a platform that is spaced from the base. First and second flexible beams are attached to the platform at one end and to the base at an opposite end. The first flexible beam has a first plurality of retention shoulders and the second flexible beam has a second plurality of retention shoulders. Each plurality of retention shoulders includes at least one retention shoulder that is spaced from every other retention shoulder in a vertical direction.

16 Claims, 1 Drawing Sheet

U.S. PATENT DOCUMENTS

| | | |
|---|---|---|
| 7,045,715 B2 | 5/2006 | Ono |
| 7,179,013 B2 * | 2/2007 | Benedetti .................... 403/388 |
| 7,186,051 B2 * | 3/2007 | Benedetti et al. ............ 403/388 |
| 7,186,068 B2 * | 3/2007 | Zoubek et al. ............... 411/510 |
| 7,229,052 B2 * | 6/2007 | Takeuchi ..................... 248/71 |
| 7,272,873 B2 * | 9/2007 | Nessel et al. .................. 24/297 |
| 2004/0223805 A1 * | 11/2004 | Benedetti et al. ............ 403/316 |
| 2007/0284486 A1 | 12/2007 | Smutny et al. |

* cited by examiner

CLIP FOR FASTENING AN ARTICLE TO A PANEL HAVING A SELF-EXPANDING CLIP HEAD

BACKGROUND OF THE INVENTION

This invention relates generally to a clip for fastening an article to a panel having a hole wherein the clip has a self-expanding head that is pushed through the hole to engage a back side of the panel.

U.S. Pat. No. 5,669,731 granted to Katsuhito Hironaka et al. Sep. 23, 1997 discloses a component such as a clip for fastening an article, in this case a wiring harness, to a panel having a hole. The clip has a self expanding head that comprises a pillar extending from a base, and a pair of flexible retaining pieces that extend from the free end of the pillar in a folded or cantilever fashion back toward the base. The free ends of the flexible retaining pieces have step sections for engaging the back side of the panel when the self-expanding head is pushed through the hole in the panel. The flexible retaining pieces are collapsed as the self expanding head is pushed into the hole. When the step sections pass through the hole, the flexible retaining pieces expand outwardly and engage the back side of the panel trapping the panel between the step sections of the flexible pieces and the base of the clip.

The step sections at the free ends of the flexible retaining pieces have a plurality of engagement sections so that the clip can be used with panels of different thicknesses and still engage the back side of the panels as illustrated in FIG. 10(a) of the Hironaka et al. '731 patent.

U.S. Patent Application Publication No. US 2007/0284486 A1 of Dale J. Smutny et al. dated Dec. 13, 2007 discloses another clip that also fastens an article, such as a wiring harness to a panel having a hole. The clip has a different arrangement for attaching the clip to the panel using the hole that extends through the panel. This arrangement also includes a base and a self-expanding head that is attached to the base and that is insertable into the hole of the panel. The self-expanding head has two sets of flexible legs that are attached to a column structure and extend back toward the base in cantilver fashion. The free ends of the flexible legs provide three sets of retention shoulders for engaging the back side of the panel whereby the clip can be used with panels of different thicknesses.

Clips with known arrangements of a base and a self-expanding head of the types described above have been used successfully for many years. However, further arrangements that provide one or more advantages and/or improvements are possible.

SUMMARY OF THE INVENTION

This invention provides a clip for fastening an article to a panel having a hole wherein the clip can be attached to panels within a wide range of thicknesses thereby reducing the number of clip sizes, manufacturing cost and inventory requirements. By way of example and not by limitation as to the scope of the claims, a typical clip of the invention can for instance be used with panels having a thickness within a range of about 0.6 mm to about 5 mm.

The clip of the invention has a self expanding head with at least two flexible beams. Each flexible beam has a plurality of retention shoulders including at least one retention shoulder that is offset vertically from any other retention shoulder. This arrangement provides an attachment to more sizes of panels within a wide range of thicknesses than that possible with the known clips of the type discussed above. Moreover, the flexible beams decrease insertion forces while retaining high retention forces in comparison to the known clips of the type discussed above.

The clip of the invention preferably has a flexible lip attached to the base for engaging the insertion side of the panel to increase the range of panel thickness that can be accommodated by the clip.

The clip of the invention also preferably includes laterally spaced columns for controlling the tilt of the self expanding head in the panel hole.

DETAILED DESCRIPTION OF THE PREFERRED EMBODIMENTS

Figure 1:
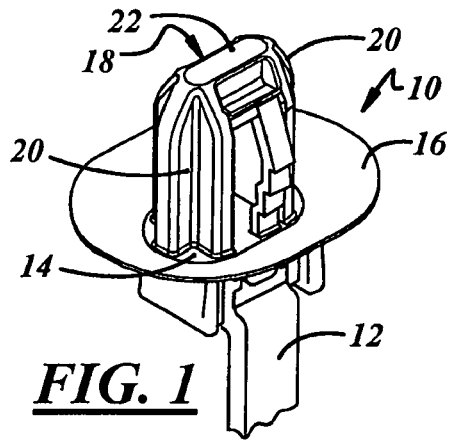
FIG. 1 is a perspective view of a self-expanding head of a clip of the invention.

Referring now to the drawing a clip 10 for attaching an article, such as a wiring harness (not shown) to a support panel is illustrated. To this end clip 10 includes a strap 12 that is wrapped around a wiring harness (not shown) and secured in a buckle 13 in a well known manner. However, it is to be understood that the strap 12, per se does not form a part of the invention because the clip 10 of the invention can be adapted to attach practically any article to a support panel, with a wiring harness merely being one of several possibilities.

Clip 10 comprises a base 14. A flexible lip 16 is attached base 14 so that it extends upwardly and outwardly from base 14. The flexible lip 16 is preferably a flexible dish with a continuous planar edge as shown. Clip 10 further includes a self expanding head 18 that is attached to base 14 so that the self expanding head 18 extends upwardly from the base past the flexible lip 16.

Figure 2:
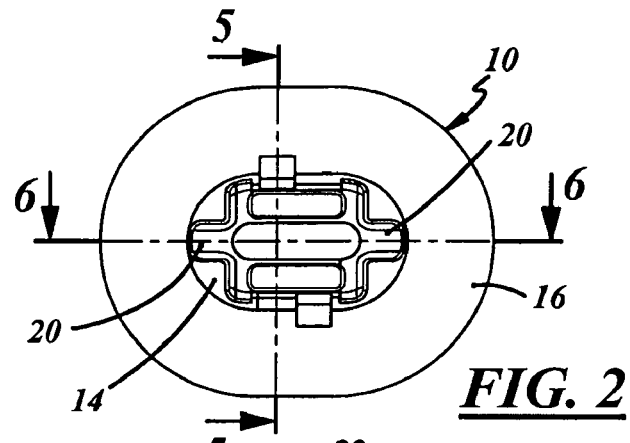
FIG. 2 is a top view of the clip shown in FIG. 1.
Figure 3:
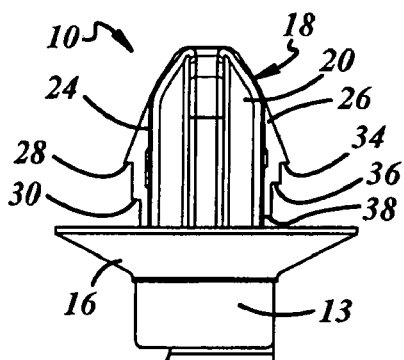
FIG. 3 is a side view of the clip shown in FIG. 1.
Figure 4:
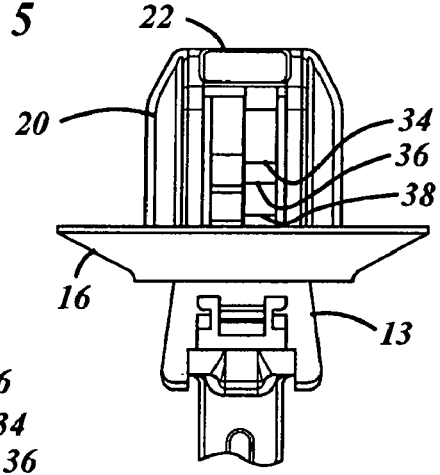
FIG. 4 is front view of the clip shown in FIG. 1.
Figure 5:
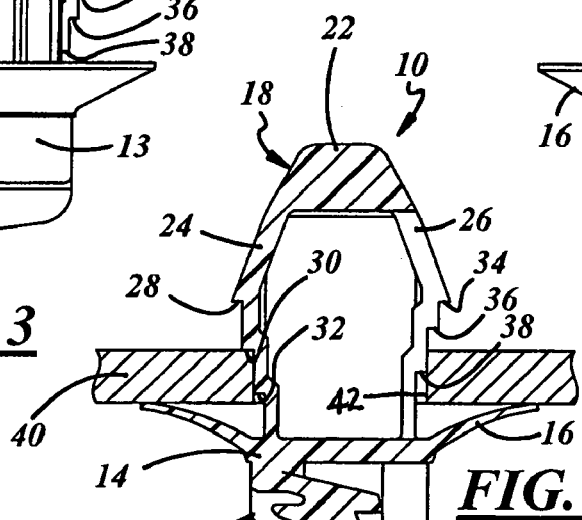
FIG. 5 is a section view taken substantially along the line 5-5 of FIG. 3 looking in the direction of the arrows and showing the clip attached to a panel of intermediate thickness under normal conditions.
Figure 6:
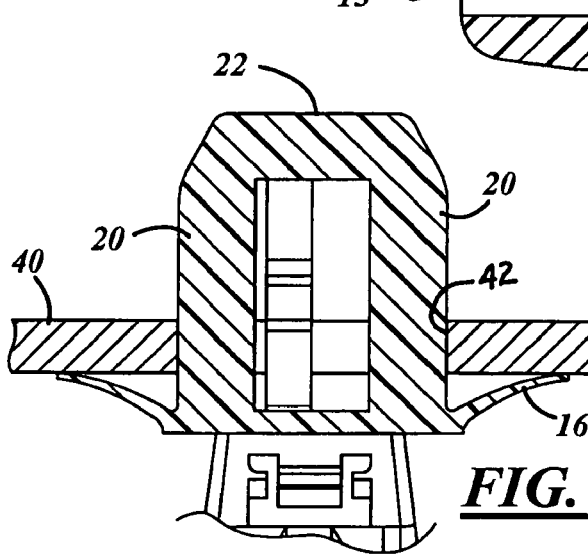
FIG. 6 is a section view taken substantially along the line 6-6 of FIG. 4 looking in the direction of the arrows and showing the clip attached to the panel of intermediate thickness under normal conditions.

The self-expanding head 18 has a pair of T-shaped columns 20 rising from base 14 to a platform 22 that is spaced from base 14 to support at least two flexible beams 24 and 26 of different configuration as explained below. Each of the flexible beams 24 and 26 are attached to platform 22 at one end and to base 14 at an opposite end as best shown in FIGS. 1, 5 and 6. The flexible beams 24 and 26 are attached to opposite sides of the platform 22 as best shown in FIGS. 2, 5 and 6. Moreover as best shown in FIG. 2, the flexible beams 24 and 26 are preferably offset from each other in the lateral direction to facilitate molding of the self-expanding head 18.

The flexible beam 24 has an uppermost retention shoulder 28 and a plurality of lower retention shoulders 30 and 32 that are spaced along the length of the flexible beam 24. The flexible beam 26 also has an uppermost retention shoulder 34 and a plurality of lower retention shoulders 36 and 38 that are spaced along the length of the flexible beam 26.

The uppermost retention shoulders 28 and 34 are preferably aligned with each other laterally so that both generally engage the back side of a thick panel as explained below. However, the lower retention shoulders 30 and 32 of the flexible beam 24 are offset from the lower retention shoulders 36 and 38 of the flexible beam 26 in the vertical direction, that is in the direction from the platform 22 to the base 14. The different respective locations of the retention shoulders 28, 30, 32, 34, 36 and 38 enable clip 10 to be attached securely to panels within a wide range of thicknesses. When the self-expanding head 18 is inserted through a hole in the panel the flexible lip 16 engages one side of the panel adjacent the hole and either one or two retention shoulders engage an opposite side of the panel adjacent the hole depending on the thickness of the panel as explained below.

Platform 22 is preferably tapered to facilitate insertion of the self-expanding head 18 into a panel hole and the outer end portions of the T-shaped columns 20 are preferably rounded and sized to engage diametrically opposite sides of the panel hole. The T-shaped columns 20 may be dimensioned so that the self-expanding head 20 fits in an oval hole.

Figure 7:
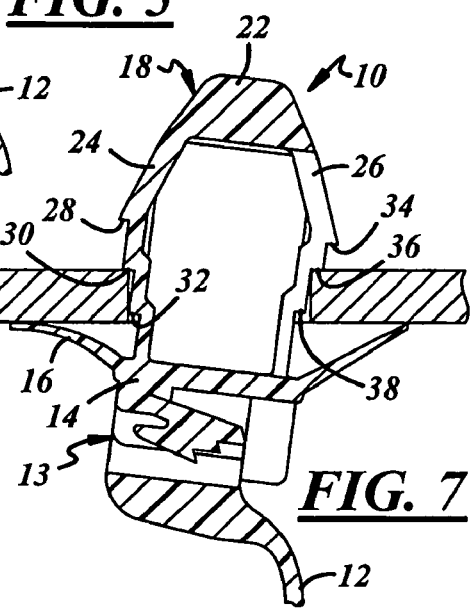
FIG. 7 is a section view taken substantially along the line 5-5 of FIG. 4 and showing the clip attached to the panel of intermediate thickness when resisting a strong pull-out force.

FIG. 5 shows clip 10 attached to a panel 40 of intermediate thickness. In this instance, when the self-expanding head 18 is inserted into the hole 42 of the panel 40, the portion of the panel 40 adjacent hole 42 is trapped between the flexible lip 16 which abuts the front or insertion side of panel 40 and the lower retention shoulder 30 of the flexible beam 24 which abuts the back side of the panel 40. The flexible beam 26 attached to the opposite side of the platform 22 merely abuts the opposite side of the hole 42 at an area between the retention shoulders 34 and 36 to hold the self-expanding head 18 substantially upright in hole 42 and to keep the lower retention shoulder 30 in engagement with the back side of the panel 40. The retention of the self-expanded head 18 in the hole 42 by a single retention shoulder such as the lower retention shoulders 30 is adequate in many instances. However, when a large force is applied to the clip 10 in the pull-out direction, the self-expanding head 18 tilts or cocks in the hole 42 and the retention shoulder 36 of the flexible beam 26 engages the back side of the panel 40 as shown in FIG. 7. There are now two retention shoulders 30 and 36 of the respective flexible beams 24 and 26 engaging the back side of panel 40 to resist pull-out. Thus, the clip 10 is securely fastened to the panel 40 even when a large pull-out force is applied.

As indicated above, the columns 20 are preferably sized to engage diametrically opposite sides of hole 42 as shown in FIG. 6. This controls the cocking or tilting of self-expanding head 18 on the ends of the columns 20.

In a similar manner, the lowermost retention shoulder 38 of the flexible beam 26 assists the lowermost retention shoulder 32 of the flexible beam 24 when a very thin panel is initially retained solely by the lowermost retention shoulder 32. In other words, a single retention shoulder of one flexible beam acts as the primary retention shoulder that usually retains the self-expanding head 18 in a panel hole, while a second offset retention shoulder of the opposite flexible beam assists the primary retention shoulder should the need arise to resist a large pull-out force. Thus the offset retention shoulders enable clip 10 to be attached to several size panels within a wide range of thicknesses. For instance, clip 10 can be attached to five different panels of progressively increasing thickness with shoulders 32, 38, 30, 36 and 28 serving as the primary retention shoulder respectively and shoulders 38, 30, 36, 28 and 34 respectively providing any necessary assistance to resist pull-out. Moreover, the flexible beams 24, 26 reduce insertion forces required for inserting the self-expanding head 18 into hole 42 while maintaining high retention forces.

As indicated above, the uppermost retention shoulders 28 and 34 are preferably aligned because there is little, if any, advantage to offsetting the assisting retention shoulder 34 when thick panels are retained.

The clip of the invention has been explained in connection with a self expanding head having two flexible beams with each flexible beam having two offset retention shoulders and preferably one aligned retention shoulder. However, the self-expanding head may have more than two flexible beams and either or both flexible beams may include a greater plurality of offset retention shoulders. Moreover, while the uppermost retention shoulders are preferably aligned, the uppermost retention shoulder of one flexible beam need not have an aligned retention shoulder on the opposite flexible beam.

In other words, it will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A clip for fastening an article to a panel having a hole, the clip comprising:
    a base,
    a self-expanding head attached to the base and extending upwardly from the base,
    the self-expanding head having at least one column rising from the base to a platform that is spaced from the base,
    a first flexible beam attached to a side of the platform at one end and to the base at an opposite end,
    the first flexible beam having a first plurality of retention shoulders,
    a second flexible beam attached to an opposite side of the platform at one end and to the base at an opposite end,
    the second flexible beam having a second plurality of retention shoulders, and
    the second flexible beam being laterally offset from the first flexible beam whereby the first flexible beam does not directly oppose the second flexible beam,
    wherein the first plurality of retention shoulders and the second plurality of retention shoulders each include at least one retention shoulder that is offset vertically from any other retention shoulder so that when the self-expanding head is inserted through a hole in the panel, the base abuts one side of the panel adjacent the hole and the at least one retention shoulder is the only retention shoulder that abuts an opposite side of the panel adjacent the hole when the self-expanding head is substantially upright in the hole.

2. The clip as defined in claim 1 wherein the at least one retention shoulder of one flexible beam is assisted by a retention shoulder of another flexible beam when the self-expanding head is titled in the hole whereby the at least one retention shoulder is the only retention shoulder that abuts an opposite side of the panel adjacent the hole up to a pull-out force of a given magnitude whereupon the retention shoulder of the another flexible beam assists the at least one retention shoulder when the pull-out force of the given magnitude is exceeded.

3. The clip as defined in claim 1 wherein the first plurality of retention shoulders and the second plurality of retention shoulders each include uppermost retention shoulders wherein the uppermost retention shoulders are aligned laterally.

4. The clip as defined in claim 1 wherein the base of the clip includes a flexible lip that slants upwardly and outwardly from the base.

5. The clip as defined in claim 1 wherein the self-expanding head has two columns extending from the base and the platform spans the columns.

6. The clip as defined in claim 5 wherein the two columns are dimensioned to engage diametrically opposite portions of the hole when the self-expanding head is substantially upright in the hole.

7. The clip as defined in claim 6 wherein the first flexible beam and the second flexible beam are attached to portions of the platform between the columns.

8. The clip as defined in claim 1 wherein the base is an oval having a major diameter and a minor diameter.

9. The clip as defined in claim 8 wherein at least one column comprises two columns being spaced from each other in a direction of the major diameter of the oval and wherein the columns are T-shaped and have rounded ends for engaging an oval-shaped hole on its major axis when the self-expanding head is substantially upright in the oval-shaped hole.

10. A clip for fastening an article to a panel having a hole, the clip comprising:
  a base,
  a self-expanding head attached to the base and extending upwardly from the base,
  the self-expanding head having at least one column rising from the base to a platform that is spaced from the base,
  a first flexible beam attached to a side of the platform at one end and to the base at an opposite end,
  the first flexible beam having a first uppermost retention shoulder and a first plurality of lower retention shoulders,
  a second flexible beam attached to an opposite side of the platform at one end and to the base at an opposite end,
  the second flexible beam having a second uppermost retention shoulder and a second plurality of lower retention shoulders, and
  the second flexible beam being laterally offset from the first flexible beam whereby the first flexible beam does not directly oppose the second flexible beam,
  wherein the first uppermost retention shoulder and the second uppermost retention shoulder are aligned vertically, and
  wherein the first plurality of lower retention shoulders and the second plurality of lower retention shoulders each include at least one lower retention shoulder that is offset vertically from any other retention shoulder so that when the self-expanding head is inserted through a hole in the panel, the base abuts one side of the panel adjacent the hole and the at least one lower retention shoulder is the only retention shoulder that abuts an opposite side of the panel adjacent the hole when the self-expanding head is substantially upright in the hole.

11. The clip as defined in claim 10 wherein the at least one lower retention shoulder of one flexible beam is assisted by a retention shoulder of another flexible beam when the self-expanding head is titled in a hole whereby the at least one lower retention shoulder is the only retention shoulder that abuts an opposite side of the panel adjacent the hole up to a pull-out force of a given magnitude whereupon the retention shoulder of the another flexible beam assists the at least one lower retention shoulder when the pull-out force of the given magnitude is exceeded.

12. The clip as defined in claim 10 wherein the base of the clip includes a flexible lip that slants upwardly and outwardly from the base.

13. The clip as defined in claim 10 wherein the self-expanding head has two columns extending from the base and the platform spans the columns.

14. The clip as defined in claim 11 wherein the base is an oval having a major diameter and a minor diameter.

15. The clip as defined in claim 14 wherein the at least one column comprising two columns are spaced from each other in a direction of the major diameter of the oval and the first flexible beam and the second flexible beam are attached to portions of the platform between the columns.

16. The clip as defined in claim 13 wherein the columns are T-shaped and have rounded ends for engaging a major axis of an oval hole.

* * * * *